(12) United States Patent
Kanatani et al.

(10) Patent No.: US 10,168,571 B2
(45) Date of Patent: Jan. 1, 2019

(54) POLARIZING PLATE WITH PRESSURE SENSITIVE ADHESIVE, FRONT PROTECTIVE PLATE AND IMAGE DISPLAY DEVICE

(71) Applicant: NITTO DENKO CORPORATION, Ibaraki-shi, Osaka (JP)

(72) Inventors: Minoru Kanatani, Ibaraki (JP); Tomotake Nashiki, Ibaraki (JP); Nozomi Fujino, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 157 days.

(21) Appl. No.: 15/200,547

(22) Filed: Jul. 1, 2016

(65) Prior Publication Data

US 2017/0003429 A1    Jan. 5, 2017

(30) Foreign Application Priority Data

Jul. 3, 2015    (JP) ................................ 2015-134493

(51) Int. Cl.
| *G02F 1/1335* | (2006.01) |
| *G02B 5/20* | (2006.01) |
| *G02B 5/30* | (2006.01) |
| *G02B 5/08* | (2006.01) |
| *G02B 1/11* | (2015.01) |
| *G02B 1/14* | (2015.01) |

(52) U.S. Cl.
CPC ..... *G02F 1/133528* (2013.01); *G02B 5/0858* (2013.01); *G02B 5/208* (2013.01); *G02B 5/3033* (2013.01); *G02B 5/3083* (2013.01); *G02B 1/11* (2013.01); *G02B 1/14* (2015.01)

(58) Field of Classification Search
None
See application file for complete search history.

(56) References Cited

U.S. PATENT DOCUMENTS

| 5,306,547 | A | * | 4/1994 | Hood | ................ B32B 17/10174 |
| | | | | | 359/360 |
| 6,078,425 | A | * | 6/2000 | Wolfe | .................... G02B 1/105 |
| | | | | | 359/360 |
| 6,211,934 | B1 | * | 4/2001 | Habing | ............. G02F 1/133509 |
| | | | | | 349/104 |
| 7,709,092 | B2 | * | 5/2010 | Qiu | .......................... B32B 7/02 |
| | | | | | 428/421 |
| 2011/0310470 | A1 | | 12/2011 | Horie | |

FOREIGN PATENT DOCUMENTS

| JP | 11-258592 A | 9/1999 |
| WO | 2010/109723 A1 | 9/2010 |

\* cited by examiner

*Primary Examiner* — Derek S Chapel
(74) *Attorney, Agent, or Firm* — Westerman, Hattori, Daniels & Adrian (57) ABSTRACT

Disclosed is a polarizing plate with a pressure sensitive adhesive including an infrared reflecting layer and a pressure sensitive adhesive layer in this over on one surface of a polarizer. The pressure sensitive adhesive layer is an outermost surface layer of the polarizing plate with a pressure sensitive adhesive. The polarizing plate with a pressure sensitive adhesive may further include a quarter wave plate.

11 Claims, 4 Drawing Sheets

POLARIZING PLATE WITH PRESSURE SENSITIVE ADHESIVE, FRONT PROTECTIVE PLATE AND IMAGE DISPLAY DEVICE

TECHNICAL FIELD

The present invention relates to a polarizing plate with a pressure sensitive adhesive, which is bonded to a front protective plate of an image display device. The present invention also relates to a front protective plate for an image display device, which includes the polarizing plate with a pressure sensitive adhesive, and an image display device.

BACKGROUND ART

Large public displays such as digital signage displays and information displays are commonly used outdoors. The viewing-side surface of an image display panel such as a liquid crystal panel or an organic electroluminescent (EL) panel used outdoors is provided with a front protective plate such as a transparent resin plate or a glass plate, in order to prevent damage to an image display panel by impacts from the outer surface and provide protection against wind and rain and dust from the outside. Generally, the viewing-side surface of a front protective plate is provided with an antireflection layer in order to suppress a reduction in visibility due to reflection of external light such as sunlight (e.g., JP-A-11-258592).

When a front protective plate is disposed on the viewing-side of an image display panel, an air gap structure (hollow structure) is employed in which an air gap is provided between a panel and a front protective plate for protecting the surface of the panel. In the air gap portion, the refractive index of air is about 1, whereas the refractive index of a plastic material or glass material that forms a polarizing plate or a front protective plate on the surface of an image display panel is about 1.5, and therefore when the air gap structure is employed, reflection or refraction of light at the interface increases. Accordingly, an image display device having a front protective plate provided on the surface of a panel has a problem that diffusion/scattering of video light emitted from an image display panel, and reflection of external light, such as sunlight easily occur, leading to a reduction in visibility (especially contrast).

In a small display mounted on a mobile phone, a smart phones or the like, an "interlayer filling structure" is employed in which a gap between an image display panel and a front protective plate is filled with a transparent resin material or pressure sensitive adhesive having a refractive index close to a refractive index of glass, resin or the like, so that reflection, scattering or the like of light due to a refractive index difference in the gap portion is reduced. On the other hand, in a large display such as a public display, it is not easy to fill a gap portion between an image display panel and a front protective plate with a resin material. When the gap portion is filled with a resin material, there is a problem that the panel temperature increases because heat of the front protective plate is easily transmitted to the panel.

JP-A-11-258592 describes a configuration in which circularly-polarizing plates are disposed above and below the gap portion, respectively, in order to improve visibility in an image display device having an air gap structure. In this configuration, the contrast can be improved by selectively emitting video light from an image display panel to the viewing-side, and suppressing reflection of external light to the viewing-side.

In addition to the problem of reduced visibility due to external light such as sunlight, a large image display device to be used outdoors has a problem that the panel temperature is caused to increase by external light. When the panel temperature increases, a display defect may occur due to degradation of an element, and an orientation disorder of liquid crystal. A main cause of panel temperature increase is near infrared rays entering thereto. By providing an infrared shielding element on a surface of a front protective plate or a panel, incidence of near infrared ray is reduced to suppress an increase in panel temperature. For example, WO 2010/109723 discloses a structure in which an anti-reflection structure is provided on viewing-side of a front protective plate, and a circularly-polarizing plate and an infrared shielding layer composed of an infrared ray absorbing material are provided on the display panel-side of the front protective plate. According to this structure, an increase in panel temperature can be suppressed by shielding of infrared ray while reflection of visible light is suppressed.

SUMMARY OF THE INVENTION

Problems to be Solved by the Invention

As described in WO 2010/109723, an increase in panel temperature can be suppressed by reducing near infrared ray that arrives at an image display panel by arranging a polarizer and an infrared shielding layer from the front protective plate side. However, the temperature of the infrared shielding layer increases due to absorption of near infrared ray, and accordingly, the temperature of the polarizer disposed adjacent to the infrared shielding layer increases, so that the polarizer is degraded to reduce visibility. Further, external light transmitted through the front protective, plate is incident directly to the polarizer to cause an increase in temperature of the polarizer. When an infrared reflecting element is used as an infrared shielding layer, near infrared ray reflected by the infrared reflecting element is incident to the polarizer again, so that the polarizer tends to be easily degraded due to an increase in temperature of the polarizer.

Means for Solving the Problems

The inventors have found that a configuration in which an infrared reflecting layer is disposed between a polarizer and a front protective plate can suppress an increase in panel temperature by shielding infrared ray while suppressing reflection of visible light. In addition, this configuration is capable of suppressing an increase in temperature of an optical element such as a polarizer.

A polarizing plate with a pressure sensitive adhesive according to the present invention includes an infrared reflecting layer and a pressure sensitive adhesive layer as an outermost surface layer on a first main surface (viewing-side surface) of a polarizer. The polarizing plate with a pressure sensitive adhesive and a transparent plate are bonded to each other with a pressure sensitive adhesive layer interposed therebetween to obtain a front protective plate for a display device. In the front protective plate, the pressure sensitive adhesive layer is bonded to a second main surface (image display panel-side surface) of the transparent plate. In an image display device, the front protective plate is disposed on the viewing-side of an image display panel with an air gap interposed therebetween.

When the polarizing plate with a pressure sensitive adhesive is used as a front protective plate, an image display device with excellent visibility is obtained since an increase in temperature of a panel is suppressed.

In one embodiment of the polarizing plate with a pressure sensitive adhesive, a quarter wave plate is disposed on the first main surface side of the polarizer in such a manner that incident light from the second main surface side to the first main surface side of the polarizer, i.e., light from the image display panel-side to the viewing-side, is emitted to the second main surface side as circularly-polarized light. The infrared reflecting layer may be provided in contact with the quarter wave plate.

In one embodiment of the polarizing plate with a pressure sensitive adhesive, a quarter wave plate is disposed on the second main surface side of the polarizer in such a manner that incident light from the first main surface side to the second main surface side of the polarizer, i.e., external light incident to the image display device, is emitted from the first main surface as circularly-polarized light.

The average reflectance of the infrared reflecting layer to near infrared ray with a wavelength of 850 to 2500 nm is preferably 30% or more. The infrared reflecting layer is, for example, a multilayered thin-film including metal oxide layers and a metal layer sandwiched therebetween. As the metal layer in the infrared reflecting layer, a silver layer, or a silver alloy layer mainly composed of silver is preferably used. As the metal oxide layer in the infrared reflecting layer, an indium-based oxide layer mainly composed of indium oxide is preferably used. The metal oxide layer is preferably an amorphous layer.

DESCRIPTION OF EMBODIMENTS

Figure 1:
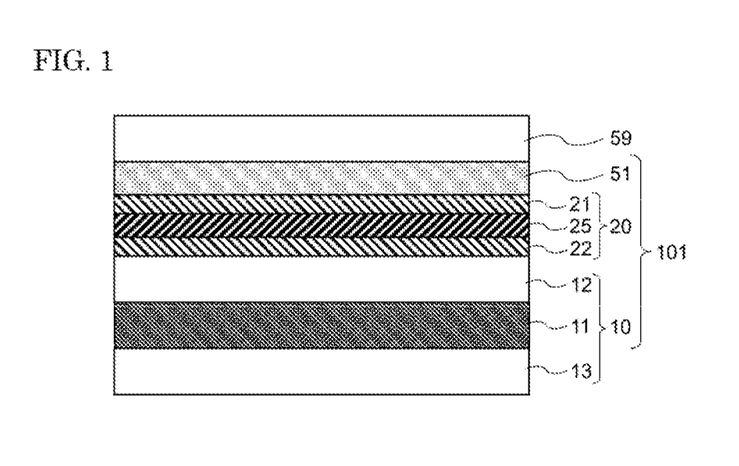
FIGS. 1, 3, 5, 6 and 8 are schematic sectional views each showing one embodiment of a polarizing plate with a pressure sensitive adhesive layer.

FIG. 1 is a schematic sectional view showing one embodiment of a polarizing plate with a pressure sensitive adhesive layer. A polarizing plate with a pressure sensitive adhesive 101 includes a polarizing plate 10 with transparent protective films 12 and 13 bonded, respectively, to both surfaces of a polarizer 11, and includes an infrared reflecting layer 20 and a pressure sensitive adhesive layer 51 on the polarizing plate 10 on the transparent protective film 13 side. The pressure sensitive adhesive layer 51 is an outermost layer of the polarizing plate with a pressure sensitive adhesive 101. In the embodiment shown in FIG. 1, a separator 59 is releasably provided for the purpose of, for example, protecting the surface of the pressure sensitive adhesive layer 51. As the separator, a plastic film, a foamed sheet, a metal foil or the like may be used. The separator may be subjected to a release treatment as necessary.

Figure 2:
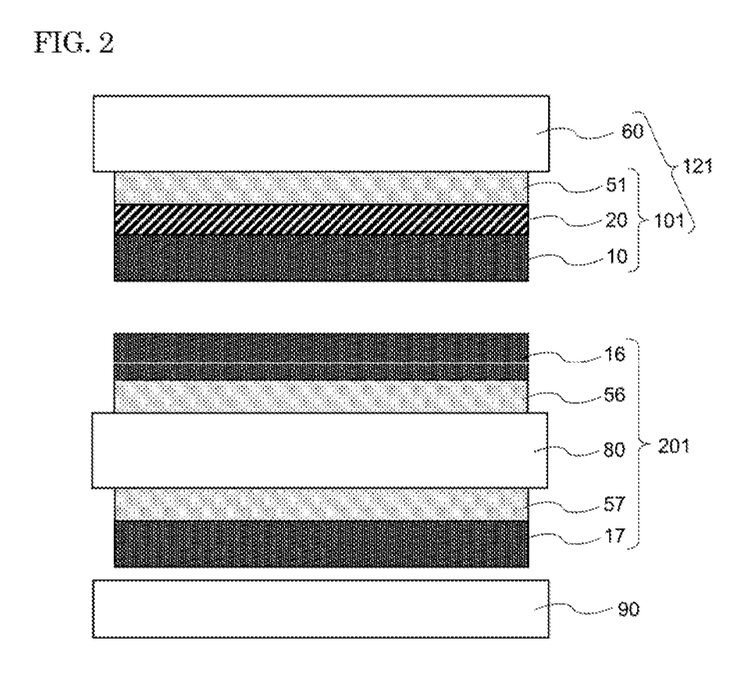
FIGS. 2 and 7 are schematic sectional views each showing one embodiment of an image display device.

FIG. 2 is a schematic sectional view showing one embodiment of an image display device including the polarizing plate with a pressure sensitive adhesive 101. In the embodiment shown in FIG. 2, a front protective plate 121 is disposed on the viewing-side of a liquid crystal panel 201 as an image display panel with an air gap interposed therebetween. The front protective plate 121 includes a transparent plate 60 and the polarizing plate with a pressure sensitive adhesive 101, which are bonded to each other with the pressure sensitive adhesive layer 51 interposed therebetween.

[Polarizing Plate with Pressure Sensitive Adhesive]

The polarizing plate with a pressure sensitive adhesive according to the present invention includes the infrared reflecting layer 20 on the first main surface side of the polarizer 11. The pressure sensitive adhesive layer 51 as an outermost surface layer is provided on the first main surface side of the polarizer.

<Polarizing Plate>

The polarizing plate 10 includes at least a polarizer 11, with an appropriate transparent protective film bonded to one or each of both surfaces of the polarizer as necessary. In the embodiment shown in FIG. 1, transparent protective films 12 and 13 are bonded, respectively, to the first main surface (surface on the viewing-side) and the second main surface (surface on the display panel-side) of the polarizer 11. The polarizer and the transparent protective film can be bonded to each other with an adhesive etc. interposed therebetween.

The polarizer 11 is, for example, one obtained by uniaxially stretching a hydrophilic polymer film such as a polyvinyl alcohol-based film, a partially formalized polyvinyl alcohol-based film or an ethylene-vinyl acetate copolymer-based partially saponified film with a dichromatic substance such as iodine or a dichromatic dye adsorbed to the film; or a polyene-based oriented film such as a dehydrated product of a polyvinyl alcohol or a dehydrochlorinated product of a polyvinyl chloride.

For transparent protective films 12 and 13 as polarizer protective films, a resin excellent in transparency, mechanical strength, heat stability moisture barrier property and optical isotropy, such as a cellulose-based, resin, a cyclic polyolefin-based resin, an acryl-based resin, a phenylmaleimide-based resin, a polycarbonate-based resin, or the like is preferably used.

A surface of the polarizing plate 10 may be subjected to an antireflection treatment, a hard coat treatment, a sticking prevention treatment, an easy adhesion treatment and so on. It is preferred that an antireflection layer not illustrated) is provided on a surface on a side opposite to a surface provided with the pressure sensitive adhesive layer 51, i.e., on a surface of a transparent protective film 12 disposed on the image display panel 201 side during formation of an image display device. An antireflection film etc. may be provided on the transparent protective film 12, instead of or in addition to an antireflection layer.

<Infrared Reflecting Layer>

The infrared reflecting layer 20 transmits visible light, and reflects near infrared ray. When a polarizing plate with a pressure sensitive adhesive 101 is bonded to the transparent plate 60, and used as the front protective plate 121 of the display device as shown in FIG. 2, an external light-derived near infrared ray transmitted through the transparent plate 60 is reflected to the transparent plate 60 side by the infrared reflecting layer 20. Accordingly, near infrared ray that arrives at the image display panel 201 can be reduced to suppress an increase in panel temperature. Particularly when the image display panel 201 and the front protective plate 121 are disposed with an air gap interposed therebetween, the former and the latter are thermally isolated from each other, so that an increase in panel temperature can be efficiently suppressed.

As shown in FIGS. 1 and 2, the infrared reflecting layer 20 is disposed between the polarizer 11 and the pressure sensitive adhesive layer 51. Accordingly, in the front protective plate 121 in which the polarizing plate with a pressure sensitive adhesive 101 and the transparent plate 60 are bonded to each other with the pressure sensitive adhesive layer 51 interposed therebetween, the infrared reflecting layer 20 and the polarizer 11 are arranged in this order from the transparent plate 60 side as an external light-incident surface. Thus, the infrared reflecting layer 20 is disposed on the external light-incident surface side of the polarizer 11, and therefore the amount of near infrared ray incident to the polarizer 11 decreases, so that degradation of the polarizer due to an increase in its temperature can be suppressed.

For suppressing an increase in temperature of the polarizer 11 and the image display panel, the average transmittance of the infrared reflecting layer 20 to near infrared ray with a wavelength of 850 to 2500 nm is preferably 60% or less, more preferably 50% or less, further preferably 40% or less, especially preferably 30% or less. The transmittance to near infrared ray can be reduced by reflecting or absorbing near infrared ray. In the polarizing plate with a pressure sensitive adhesive, the infrared reflecting layer 20 and the polarizer 11 are laminated, and are not thermally isolated from each other, and therefore it is preferred to reduce the transmittance to near infrared ray by reflection for suppressing an increase in temperature of the polarizer 11. Accordingly, the average reflectance of the infrared reflecting layer 20 to near infrared ray with a wavelength of 850 to 2500 nm is preferably 30% or more, more preferably 40% or more, further preferably 50% or more.

Preferably the infrared reflecting layer 20 has a high visible light transmittance because it is disposed on the viewing-side of the image display panel. The average transmittance of the infrared reflecting layer to light with a wavelength of 400 to 780 nm is preferably 70% or more, more preferably 75% or more, further preferably 80% or more.

As the infrared reflecting layer having a high transmittance to visible light and a high reflectance to near infrared ray, a multilayered thin-film in which a metal layer and a metal oxide layer are laminated is preferable. Among them, an interlaminate of a metal layer with high infrared reflectance and a metal oxide layer is particularly preferable. Preferable example of the interlaminate includes a multilayered thin-film in which a metal layer 25 is held between a first metal oxide layer 21 and a second metal oxide layer 22 as shown in FIG. 1.

The infrared reflecting layer 20 may be composed of three layers: the first metal oxide layer 21, the metal layer 25 and the second metal oxide layer 22, or may include other layers. The infrared reflecting layer 20 may include other metal layer, metal oxide layer and the like between metal layer 25 and the metal oxide layers 21 and 22, for the purpose of, for example, improving adhesion between the metal layer and the metal oxide layers, and imparting durability to a metal layer. Wavelength selectivity in transmission and reflection of visible light and a near infrared ray can also be improved by further adding metal layers and metal oxide layers on the polarizer 11 side of the first metal oxide layer 21 to increase the lamination number such that the infrared reflecting layer 20 has a five-layer structure, a seven-layer structure or the like. On the other hand, for improving productivity and reducing production costs, it is preferred that the infrared reflecting layer 20 is composed of three layers, namely, the first metal oxide layer 21, the metal layer 25 and the second metal oxide layer 22.

The metal layer 25 of the infrared reflecting layer 20 plays a central role in infrared ray reflection. As a material for the metal layer 25, a metal such as Au, Ag, Cu or Al, or an alloy containing two or more of these metals is used. Particularly a silver layer, or a silver alloy layer mainly composed of silver is preferably used as the metal layer 25 for increasing the visible light transmittance and infrared ray reflectance. Silver has a high free electron density, so that a high near infrared ray reflectance can be achieved.

The content of silver in the metal layer 25 is preferably 90% by weight or more, more preferably 93% by weight or more, further preferably 95% by weight or more. When the content of silver in the metal layer is increased, wavelength selectivity in the transmittance and the reflectance is improved, so that the visible light transmittance of the infrared reflecting layer 20 can be increased. When the metal layer 25 is a silver alloy layer, it is preferred that palladium, gold, copper, bismuth, germanium, gallium or the like is contained as a metal other than silver to improve durability of the metal layer. Particularly, palladium is most suitably used for imparting high durability to silver.

The metal oxide layers 21 and 22 are provided for the purpose of for example, securing both a high visible light transmittance and an infrared ray reflectance by controlling the reflection amount of visible light, at the interface between the metal oxide layers and the metal layer 25. The refractive index of the metal oxide layers 21 and 22 to visible light is preferably 1.5 or more, more preferably 1.6 or more, further preferably 1.7 or more for improving wavelength selectivity in reflection and transmission by the infrared reflecting layer 20. Examples of the material having a refractive index as described above include oxides of metals such as Ti, Zr, Hf, Nb, Zn, Al, Ga, In, Tl, Ga and Sn, and composite oxides of these metals. Among them, indium-based oxides mainly composed of indium oxide such as indium tin oxide (ITO) and indium zinc oxide (IZO) are preferably used for achieving a high refractive index and a high visible light transmittance.

The metal oxide layers 21 and 22 in the infrared reflecting layer 20 are preferably amorphous. When the metal oxide layers are amorphous, it is excellent in barrier property to a gas such as water vapor because the number of grain boundaries is small and the film density is high, so that degradation of the metal layer 25 can be suppressed.

The thickness of each of the metal layer 25 and metal oxide layers 21 and 22 is appropriately set in view of, for example, the refractive index of the material so that the infrared reflecting layer 20 transmits visible light, and selectively reflects near infrared ray. The reflectance to near infrared ray is increased as the thickness of the metal layer 25 increases. On the other hand, when the thickness of the metal layer is excessively large, the visible light transmittance tends to decrease. Accordingly, the thickness of the metal layer 25 is preferably 3 to 30 nm, more preferably 4 to 25 nm, further preferably 5 to 20 nm. The thickness of each of the metal oxide layers 21 and 22 is preferably 3 to 60 nm, more preferably 5 to 50 nm, further preferably 10 to 45 nm. Although the method for forming the metal layer and metal oxide layer is not particularly limited, it is preferably a dry process such as a sputtering method, a vacuum vapor deposition method, a chemical vapor deposition (CVD) method or an electron beam vapor deposition method.

Figure 3:
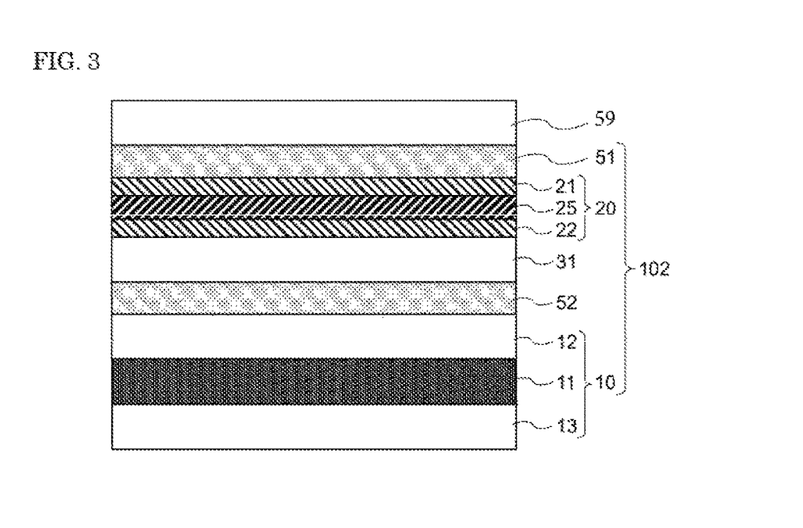

As a substrate on which an infrared reflecting layer is formed, a transparent film material is preferably used. In the embodiment shown in FIG. 1, the infrared reflecting layer 20 is provided on the transparent protective film 12 for the polarizing plate, but the infrared reflecting layer may be provided on other film substrate. For example, the infrared reflecting layer may be formed directly on the polarizer such that the infrared reflecting layer is in contact with the polarizer. As shown in FIG. 3, in a polarizing plate with a pressure sensitive adhesive 102 an infrared reflecting film with an infrared reflecting layer formed on a transparent film substrate 31 may be prepared, followed by laminating the infrared reflecting film to the polarizing plate 10 with appropriate bonding materials such as a pressure sensitive adhesive layer 52 interposed therebetween. The infrared reflecting layer 20 of the infrared reflecting film may be on the polarizer 11 side, although the infrared reflecting layer 20 is disposed on the polarizer 11 side of the transparent film substrate 31 in the infrared reflecting film shown in FIG. 3.

Figure 4:
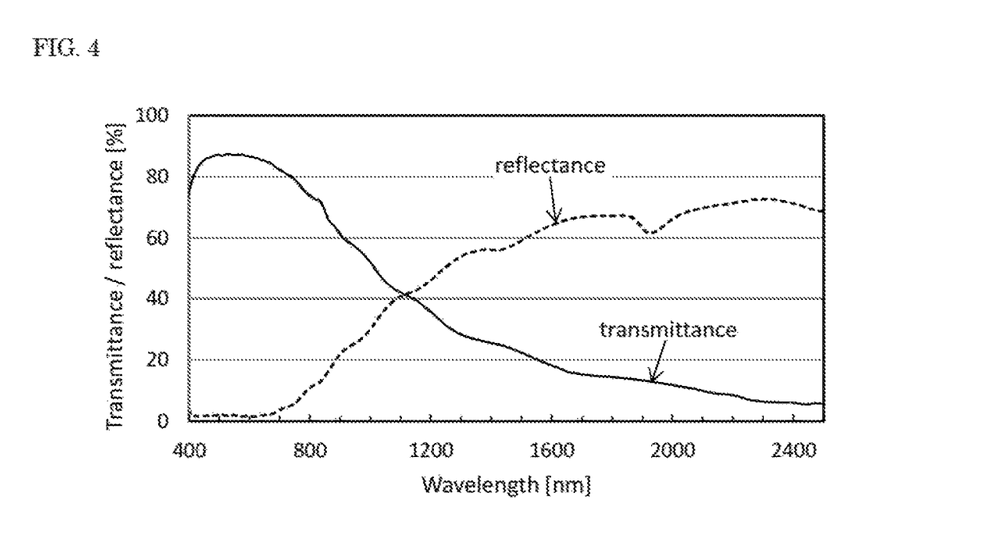
FIG. 4 shows a transmission spectrum and a reflection spectrum of an infrared reflecting film.

FIG. 4 shows a transmission spectrum and a reflection spectrum of an infrared reflecting film in a visible to near infrared region. The infrared reflecting film includes an amorphous ITO layer (30 nm), an Ag—Pd alloy layer (8 nm) and an amorphous ITO layer (30 nm) on a PET film. As shown in FIG. 4, an infrared reflecting layer with a metal layer held between metal oxide layers show a high transmittance to visible light (400 to 780 nm) and a reflectance to near infrared ray (850 to 2500 nm), and thus is preferred configuration as an infrared reflecting layer for use in display device.

<Pressure Sensitive Adhesive Layer>

The outermost surface layer of the polarizing plate with a pressure sensitive adhesive 101 is the pressure sensitive adhesive layer 51 for bonding the polarizing plate to the transparent plate 60. As the pressure sensitive adhesive layer, one having a high visible light transmittance is preferably used. For example, an acryl-based adhesive is suitable as a material for the pressure sensitive adhesive layer 51 for bonding with the transparent plate 60, since it shows excellent optical transparency moderate wettability, cohesiveness and bondability, and is excellent in weather resistance, heat resistance and so on. The thickness of the pressure sensitive adhesive layer 51 is generally about 5 to 500 μm, preferably about 10 to 300 μm.

The pressure sensitive adhesive layer 51 is the outermost surface layer of the polarizing plate with pressure sensitive adhesive 101, and is therefore preferably temporarily provided and covered with the separator 59 for the purpose of, for example, preventing contamination of the exposed surface until the pressure sensitive adhesive layer 51 is bonded to the transparent plate etc. Accordingly, contamination due to contact of the exposed surface of the pressure sensitive adhesive to the outside can be prevented during handling.

[Front Protective Plate]

The polarizing plate with a pressure sensitive adhesive 101 is bonded to the transparent plate 80 with the pressure sensitive adhesive layer 51 interposed therebetween to form the front protective plate 121 for a display device. The front protective plate 121 is disposed on the viewing-side surface of the image display device in order to prevent, damage to an image display panel by impacts from the outer surface and provide protection against wind and rain and dust etc. from the outside. When bonded to a polarizing plate with a pressure sensitive adhesive, which includes an infrared reflecting layer, the front protective plate can also serve to prevent an increase in temperature of the image display panel and improve visibility.

<Transparent Plate>

As the transparent plate 60, a transparent member having an appropriate mechanical strength and thickness is used. As the transparent plate 60, for example, a glass plate a transparent resin plate such as made of acryl-based resin, polycarbonate-based resin, or the like is used.

The transparent plate 60 preferably has a visible light antireflection structure on a first main surface (viewing-side surface), namely, a surface on a side opposite to a surface provided with the polarizing plate. When the transparent plate has a visible light antireflection structure on the viewing-side surface thereof, reflection of visible light at the surface of the transparent plate can be reduced to improve the visibility of the image display device. Examples of the visible light antireflection structure on the surface of the transparent plate 60 include antireflection layers composed of thin-film multilayers, and nano-structures such as moth-eye structures. The visible light antireflection structure may be provided directly on the surface of the transparent plate 80. An antireflection structure may be provided on the transparent plate 60 by bonding a film with antireflection structure formed beforehand.

[Image Display Device]

In the image display device according to the present invention, the front protective plate is provided on the viewing-side of the image display panel with an air gap interposed therebetween. For example, the image display panel 201 is placed in a housing (not illustrated), and the front protective plate 121 is provided on the surface to cover the display panel and the housing, thereby obtaining an image display device in which an image display panel and a front protective plate are disposed with an air gap interposed therebetween. In addition to the image display panel, a light source 90, a driver for driving the image display panel, and so on may be placed in the housing.

<Image Display Panel>

In the embodiment shown in FIG. 2, the liquid crystal panel 201 in which polarizing plates 16 and 17 are provided on both surfaces of a liquid crystal cell 80 with pressure sensitive adhesive layers 56 and 57, respectively interposed therebetween, is shown as an image display panel. The light source 90 is provided on a surface on a side opposite to the viewing-side of the liquid crystal panel 201 (a surface on the polarizing plate 17 side). The light, source 90 may be a plane light, source, or a side light-type light source.

As each of polarizing plates 16 and 17, for example, one obtained by bonding a protective film to one or both of the surfaces of a polarizer with an adhesive etc. interposed therebetween similarly to the polarizing plate 10 of the front protective plate 121 is used. A retarder, a wide-viewing film, or the like may be provided between the polarizer and the liquid crystal cell. A brightness enhancement film etc. may be provided between the polarizing plate 17 and the light source 90.

In the image display device according to the present invention, the polarizing plate 16 on the viewing-side of the liquid crystal panel may be omitted because the polarizing plate 10 is provided on the front protective plate 121. When the polarizing plate 10 is provided on the front protective plate 121, and the viewing-side polarizing plate 16 is provided on the liquid crystal panel 201, it is preferred that these polarizing plates are arranged in such a manner that the absorption axis directions of the polarizers of both the polarizing plates are parallel to each other.

In the image display device according to the present invention, near infrared ray transmitted through the transparent plate 60 to enter the image display device can be selectively reflected by the infrared reflecting layer 20 to reduce the near infrared ray that arrives at the image display panel 201. Accordingly, even when the image display device is installed outdoors, an increase in panel temperature, which is caused by external light such as sunlight, can be suppressed to prevent occurrence of a display defect associated with degradation of the element and an orientation disorder of liquid crystal. Since the infrared reflecting layer 20 reflects near infrared ray, an increase in temperature of the front protective plate is also suppressed in comparison with a case where an infrared ray absorbing element is provided. Further, the infrared reflecting layer 20 is disposed between the transparent plate 60 and the polarizer 11, the amount of near infrared ray transmitted through the transparent plate 60 to arrive at the polarizer 11 decreases, so that degradation of the polarizer due to an increase in temperature thereof is suppressed.

[Other Configurations of Polarizing Plate with Pressure Sensitive Adhesive and Image Display Device]

As long as an infrared reflecting layer and a pressure sensitive adhesive layer as an outermost surface layer are provided on the first main surface of the polarizer, the stacking configuration of the polarizing plate with a pressure sensitive adhesive is not limited to the one shown in FIG. 1. The polarizing plate with a pressure sensitive adhesive may include other optical film etc. As long as a front protective plate is disposed on the viewing-side of the image display panel with an air gap interposed therebetween, the image display device is not limited to the configuration shown in FIG. 2. The image display panel is not limited to a liquid crystal panel, and may be an organic EL panel or a plasma panel. When a self-emission panel such as an organic EL panel or a plasma panel is used, a light source may be omitted.

Figure 5:
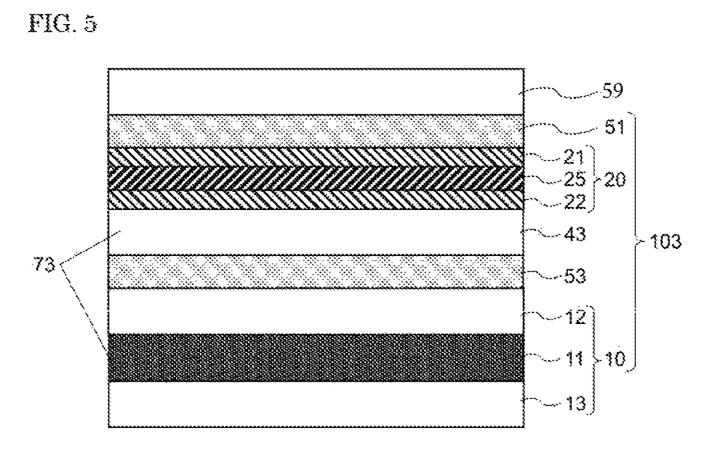

In a polarizing plate with a pressure sensitive adhesive 103 as shown in FIG. 5, a first quarter wave plate 43 is disposed on the first main surface side of the polarizer 11. When the quarter wave plate 43 is arranged in such a manner that the absorption axis direction of the polarizer 11 and the slow axis direction of the quarter wave plate 43 form an angle of substantially 45°, the polarizer 11 and the quarter wave plate 43 compose a circularly-polarizing plate 73. In this configuration, incident light from the second main surface side (image display panel-side) of the polarizer 11 is emitted to the first main surface side as circularly-polarized light, and arrives at a viewer through the transparent plate. Thus, video light, arrives at a viewer as circularly-polarized light, and therefore even a viewer wearing polarized sunglasses can be allowed to visually recognize an appropriate display image.

The retardation of the quarter wave plate, and the angle between the absorption axis direction of the polarizer and the slow axis direction of the quarter wave plate may be in such a range that linearly-polarized light emitted from the polarizer is converted into substantially circularly-polarized light. The "substantially circularly-polarized light" may include not only completely circularly-polarized light, but also light close to completely circularly-polarized light, i.e., elliptically-polarized light with an ellipticity close to 1. For example, the "quarter wave" encompasses one in which the retardation at a wavelength of 550 nm is in the range of 137.5±30 nm. The retardation of the quarter wave plate at a wavelength of 550 nm is preferably 137.5±20 nm, more preferably 137.5±10 nm. The angle between the absorption axis direction of the polarizer and the slow axis direction of the quarter wave plate is substantially 45° when it is in the range of generally 35° to 55°, preferably 40° to 50°, more preferably 43° to 47°, further preferably 44° to 46°.

In the embodiment shown in FIG. 5, the transparent protective film 12 is bonded onto the first main surface of the polarizer 11, and the first quarter wave plate 43 is bonded onto the transparent protective film 12 with a pressure sensitive adhesive layer 53 interposed therebetween. A first quarter wave plate which can also function as a polarizer protective film may be bonded onto the polarizer 11. The first quarter wave plate may be made of a laminate of two or more films. For example, when films having different wavelength dispersions of retardation are laminated, the wavelength dispersion of retardation of the quarter wave plate can be adjusted to obtain wide band circularly-polarizing plate. By laminating a plurality of films to adjust three-dimensional refractive index anisotropy (refractive index ellipsoid), viewing angle dependency can be reduced.

When the first quarter wave plate 43 is provided on the first main surface of the polarizer 11 to form the circularly-polarizing plate 73, it is preferred that the infrared reflecting layer 20 is provided in contact with the top of the first quarter wave plate 43 without interposing other film, an adhesive layer or the like. When the infrared reflecting layer is formed directly on the quarter wave plate, the lamination number of films can be reduced, and other birefringence layer is not interposed, and therefore the optical characteristics of the quarter wave plate can be maintained, so that good visibility is achieved. When the infrared reflecting layer is formed on a base film other than the quarter wave plate, the base film is preferably optically isotropic for maintaining the polarized state to retain good visibility. Specifically, a base film with a front retardation of 10 nm or less at a wavelength of 550 nm is preferably used. The infrared reflecting layer may be disposed between the polarizer and the first quarter wave plate, although the infrared reflecting layer 20 is disposed between the first quarter wave plate 43 and the pressure sensitive adhesive layer 51 in FIG. 5.

Figure 6:
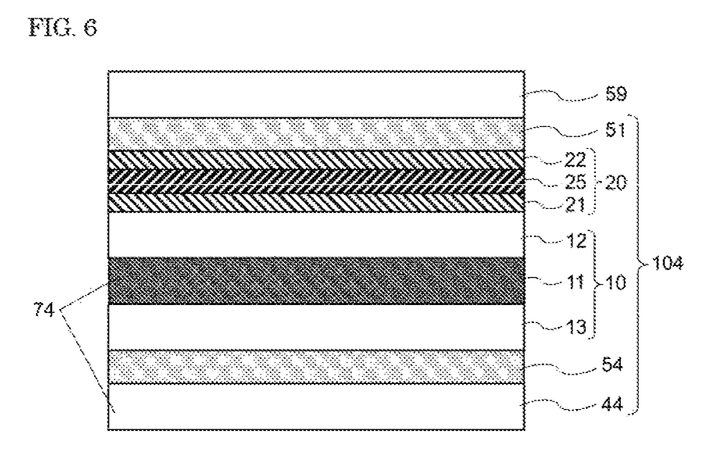

In a polarizing plate with a pressure sensitive adhesive 104 as shown in FIG. 6, a second quarter wave plate 44 is and disposed on the second main surface side of the polarizer 11, and the polarizer 11 and the second quarter wave plate 44 compose a circularly-polarizing plate 74. In this embodiment, incident light from the first main surface side (viewing-side) of the polarizer 11 is emitted to the second main surface side (image display panel-side) as circularly-polarized light. In the embodiment shown in FIG. 6, the transparent protective film 13 is bonded onto the second main surface of the polarizer 11, and the second quarter wave plate 44 is bonded onto the transparent protective film 13 with a pressure sensitive adhesive layer 54 interposed therebetween. A second quarter wave plate which can also function as a polarizer protective film may be bonded onto the polarizer 11. The second quarter wave plate may be made of a laminate of two or more films.

Figure 7:
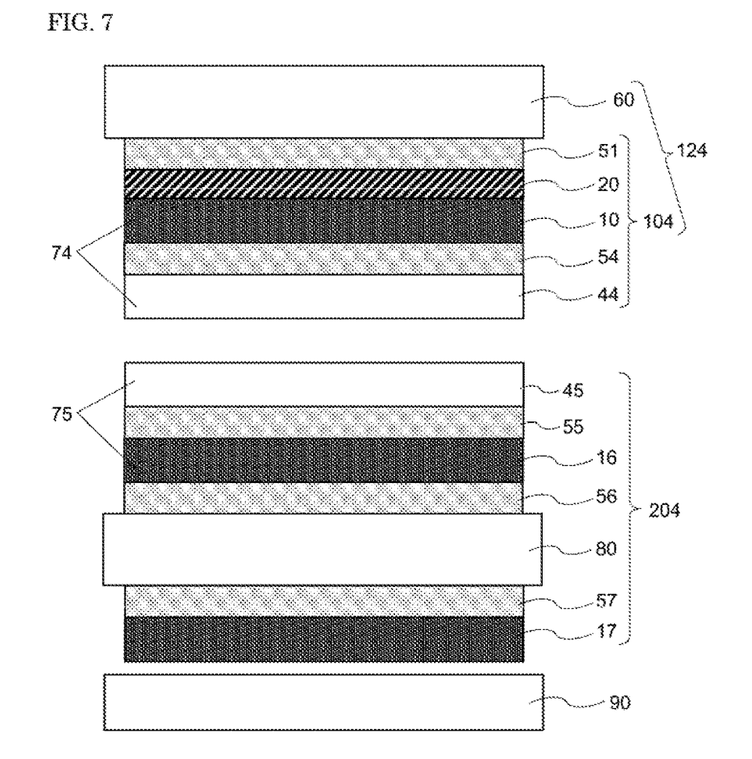

FIG. 7 is a schematic sectional view showing one embodiment of an image display device including a front protective plate 124 in which the polarizing plate with a pressure sensitive adhesive 104 is bonded to the transparent plate 60. In the embodiment shown in FIG. 7, a front protective plate 124 is disposed on the viewing-side of a liquid crystal panel 204 as an image display panel with an air gap interposed therebetween. In the liquid crystal panel 204, a quarter wave plate 45 is bonded to the viewing-side polarizing plate 16 on the viewing-side with a pressure sensitive adhesive layer 55 interposed therebetween, and the polarizing plate 16 and the quarter wave plate 45 compose a circularly-polarizing plate 75.

Linearly-polarized light (video light) emitted from the image display cell 80 and transmitted through the polarizing plate 16, is converted into circularly-polarized light by the quarter wave plate 45. The circularly-polarized light is converted into linearly-polarized light again by the quarter wave plate 44. When the two circularly-polarizing plates 73 and 74 have the same polarity, i.e., each of the circularly-polarizing plates 75 and 74 is a right circularly-polarizing plate or a left circularly-polarizing plate, the vibration direction of linearly-polarized light that arrives at the polarizing plate 10 is identical to the transmission axis direction of the polarizing plate 10. Accordingly, video light emitted from the image display cell to the viewing-side is hardly absorbed by the polarizing plate 10 of the front protective plate, and is emitted to the viewing-side through the transparent plate 60.

On the other hand, external light transmitted through the transparent plate 60 is converted into linearly-polarized light by the polarizing plate 10, and converted into circularly-polarized light by the quarter wave plate 44. The circularly-polarized light is reflected at the interface of the air gap portion to the viewing-side, then incident to the quarter wave plate again, and converted into linearly-polarized light. The linearly-polarized light, derived from reflected light is absorbed by the polarizing plate 10 because the vibration direction is orthogonal to the transmission aids direction of the polarizing plate 10. Accordingly reemission of reflected light to the viewing-side is suppressed.

When an air gap exists between the front protective plate 124 and the image display panel 204, and the circularly-polarizing plates 74 and 75 are disposed above and below the air gap, respectively as described above, emitted light from the image display panel is transmitted to the viewing-side, and reflected light at the air gap interface is absorbed by the circularly-polarizing plate 74. Therefore, reflection of visible light can be reduced to obtain an image display device with improved visibility. Further, the infrared reflecting layer 20 is disposed on the viewing-side from the polarizing plate 10, so that the amount of near infrared ray that arrives at the polarizing plate 10 and the image display panel 204 can be reduced to suppress an increase in temperature. Therefore, an increase in temperature, which is caused by external light, can be suppressed by reflecting near infrared ray to the viewing-side, and a reduction in visibility due to reflection of external light can be reduced by suppressing reemission of visible light reflected at the air gap interface.

Figure 8:
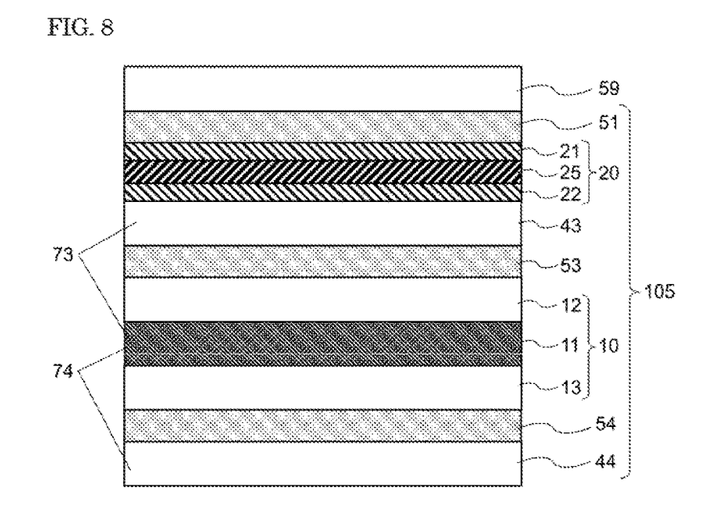

In a polarizing plate with a pressure sensitive adhesive 105 as shown in FIG. 8, the first quarter wave plate 43 is disposed on the first main surface side of the polarizer 11, and the second quarter wave plate 44 is disposed on the second main surface side of the polarizer 11. The polarizer 11 and the first quarter wave plate 43 compose the circularly-polarizing plate 73, and the polarizer 11 and the second quarter wave plate 44 compose the circularly-polarizing plate 74. When an image display device is formed in the same manner as in the embodiment shown in FIG. 7 using the polarizing plate with a pressure sensitive adhesive 105, reflection of visible light is suppressed by the circularly-polarizing plate 74 on the second main surface side, and a viewer wearing polarized sunglasses can be allowed to visually recognize an appropriate display image due to the circularly-polarizing plate 73 on the first main surface side.

What is claimed is:

1. An image display device comprising; an image display panel and a front protective plate, wherein
the front protective plate includes: a first polarizer; an infrared reflecting layer; a pressure sensitive adhesive layer; and a transparent plate in this order,
the transparent plate has a first main surface on a viewing-side and a second main surface on an image display panel side,
the first polarizer, the infrared reflecting layer, the pressure sensitive adhesive layer and the transparent plate are laminated together, and the second main surface of the transparent plate is bonded to the pressure sensitive adhesive layer,
the image display panel includes: an image display cell; and a second polarizer disposed on a viewing-side of the image display cell,
the front protective plate is disposed on a viewing-side of the image display panel with an air gap interposed therebetween.

2. The image display device according to claim 1, wherein the front protective plate further includes a first quarter wave plate between the first polarizer and the pressure sensitive adhesive layer, and
the first polarizer and the first quarter wave plate are arranged in such a manner that incident light from a second main surface side to a first main surface side of the first polarizer and through the first quarter wave plate is emitted from the first quarter wave plate as circularly-polarized light.

3. The image display device according to claim 2, wherein the infrared reflecting layer is provided in contact with the first quarter wave plate.

4. The image display device according to claim 1, wherein the front protective plate further includes a second quarter wave plate on a second main surface of the first polarizer, and
the first polarizer and the second quarter wave plate are arranged in such a manner that incident light from a first main surface side to a second main surface side of the first polarizer and through the second quarter wave plate is emitted from the second quarter wave plate as circularly-polarized light.

5. The image display device according to claim 1, wherein an average reflectance of the infrared reflecting layer to a near infrared ray with a wavelength of 850 to 2500 nm is 30% or more.

6. The image display device according to claim 1, wherein the infrared reflecting layer is a multilayered thin-film with a metal layer held between a first metal oxide layer and a second metal oxide layer.

7. The image display device according to claim 6, wherein the metal layer is a silver layer or a silver alloy layer, and a content of silver in the metal layer is 90% by weight or more.

8. The image display device according to claim 6, wherein each of the first metal oxide layer and the second metal oxide layer is an indium-based oxide layer.

9. The image display device according to claim 6, wherein each of the first metal oxide layer and the second metal oxide layer is an amorphous metal oxide layer.

10. The image display device according to claim 1, further including a visible light anti-reflection structure on the first main surface of the transparent plate.

11. The image display device according to claim 1, wherein
the front protective plate further includes a second quarter wave plate on a second main surface of the first polarizer,
the first polarizer and the second quarter wave plate compose a first circularly-polarizing plate, wherein the first polarizer and the second quarter wave plate are arranged in such a manner that incident light from a first main surface side to a second main surface side of the first polarizer and through the second quarter wave plate is emitted from the second quarter wave plate as circularly-polarized light, the image display panel further includes a third quarter wave plate on a first main surface of the second polarizer, the second polarizer and the third quarter wave plate compose a second circularly-polarizing plate, wherein the second polarizer and the third quarter wave plate are arranged in such a manner that incident light from a second main surface side to a first main surface side of the second polarizer and through the third quarter wave plate is emitted from the third quarter wave plate as circularly-polarized light, and the first circularly-polarizing plate and the second circularly-polarizing plate have the same polarity.

\* \* \* \* \*